Sept. 28, 1954  W. E. O'SHEI  2,689,998
BAND OR HOSE CLIP
Filed July 14, 1952
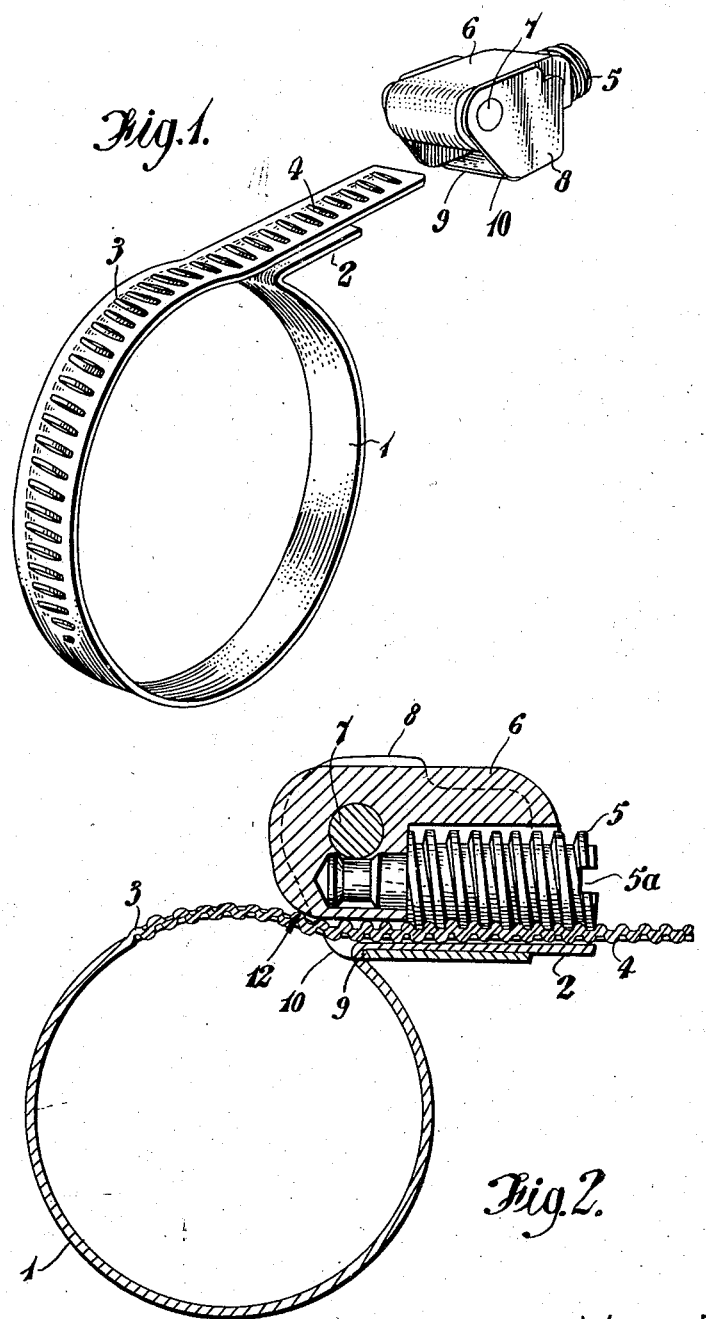
Inventor
William E. O'Shei
By Emery Holcombe & Blair
Attorney Patented Sept. 28, 1954

2,689,998

UNITED STATES PATENT OFFICE 2,689,998

BAND OR HOSE CLIP

William Edward O'Shei, London, England

Application July 14, 1952, Serial No. 298,738

Claims priority, application Great Britain
July 27, 1951

8 Claims. (Cl. 24—274)

The present invention relates to band or hose clips of the worm-gear type in which one end of the band is provided with a series of serrations or part-threads, which are adapted to be engaged by a screw carried at the other end of the band, the rotation of the screw tightening the band.

Hitherto with such hose clips, the screw has been carried by an ear or housing member (herein referred to as "screw supporting means") secured to the plain end of the band. Examples of such constructions are shown in British specifications Nos. 602,458, 607,595, 607,597, 607,612 and United States Patent No. 1,397,508 of A. F. Gillet dated November 22, 1921. In all cases the worm screw extends substantially parallel to the inner surface of the plain end of the band, a part of the screw supporting means extending beneath the plain end of the band, which interferes with the uniform curvature of the internal surface of the band and introduces gaps between said internal surface and the hose to be gripped, which give rise to the possibility of leakage.

The present invention has for an object to provide a band or hose clip of improved construction in which the worm screw extends in a direction which enables it to exert a greater tightening effect on the band, and enables the clip to tighten on smaller diameters of hose than has hitherto been possible. A further object is to provide a band or hose clip in which the internal peripheral surface of the clip is substantially continuous and is devoid of gaps or spaces as have hitherto been produced where the screw supporting means is attached to the band.

The present invention consists in a band or hose clip of the worm-gear type, in which the band is provided at one end thereof with a series of part-threads which are adapted to be engaged by a worm screw carried by screw supporting means at the other end of the band, wherein said other end of the band is provided with a support extending outwardly at an acute angle to the inner surface of the band at said other end, the worm screw being mounted relative to said support so as to engage with the part threads when the threaded end of the band is positioned to overlie said support.

According to a feature of the invention, said support is formed by folding a short length of the plain end of the band back towards the outer surface of the band so as to form an acute angle, for example of about 45°, to the surface of the unfolded part of the plain end of the band, the threaded end of the band being adapted to overlie this folded back portion and being engaged by the threads of a worm screw of which the supporting means is carried by or attached to the folded back portion of the band. The screw supporting means may be made integral with the folded back portion of the band, but is preferably made separate therefrom and attached thereto by a portion of the screw supporting means fitting beneath the folded back portion of the band.

Preferably the screw supporting means and the worm screw carried thereby are formed as a unit separate from the band, being fitted over the serrated end and the folded back portion of the plain end after these two parts of the band have been placed together. To facilitate fitting the screw unit in position, the screw is preferably carried by a trunnion member which is pivoted to an ear member, for example as described in specifications Nos. 602,458 and 607,612. This enables the screw unit to be quickly and easily fitted over the folded back portion and the overlying serrated portion, whereafter the trunnion is turned about its pivot to bring the screw into engagement with the threaded end of the band. Turning the screw then tightens the band.

In order that the invention may be more fully understood, an embodiment thereof will now be described with reference to the accompanying drawings, in which:

Fig. 1 shows an exploded perspective view of a hose clip constructed according to the invention, and Fig. 2 shows a side elevation, partly in section, of the hose clip shown in Fig. 1.

Referring to the drawings, the band 1, bent to circular form, has its plain end 2 folded back towards the outer surface of the band so as to form an acute angle, for example of about 45°, to the outer surface (and also, of course, to the inner surface) of that end of the band. The opposite end 4 of the band is formed with part-threads 3, and is adapted to overlie the support constituted by the outer surface of the folded back end 2. The part-threads may be formed in any convenient manner, for example by a pressing operation, or alternatively by blanking out transverse slots from the band material. These part-threads 3, are engaged by a rotatable worm screw 5, carried by the trunnion member 6 which is pivotally mounted on the pivot pin 7, to an ear member comprising the upstanding ears 8 connected by a transverse portion 9. The worm screw and its supporting means comprising the trunnion member and ear member are preferably assembled as described in British Specification No. 602,458. The transverse portion 9 may be fixed to the folded back end 2, for example by riveting or welding. Preferably, however, the worm screw, trunnion member and ear member are retained as a unit separate from the band, which unit is slipped over the ends 2 and 4, after they have been placed together, and held in position when the worm screw 5 is tightened with the ends 2 and 4 clamped between the threads of the worm screw 5 and the transverse portion 9. To facilitate the fitting of the ends of the band into the worm screw unit, the trunnion member 6 is swung about the pivot 7 to move the worm screw 5 out of the plane of engagement with the threaded portion of the band. When the ends are fitted into the unit the trunnion member 6 is swung back to bring the threads of the worm screw into engagement with the part-threads of the band and the screw is tightened by means of a screwdriver, the blade of which is inserted in the slot 5a provided in the rear end of the screw 5. The forward ends of the ears 8 are preferably shaped to provide portions 10 which, as the band is tightened, bridge the gap where the two ends of the band meet and press on the hose to prevent leakage at this point.

The tightening of the worm screw 5 causes the front end of the trunnion member 6 to engage with the outer surface of the band, as is indicated at 12 in Fig. 2, which urges the trunnion member to turn in a clockwise direction, as seen in Fig. 2, thereby to lock the screw in engagement with the part-threads 3 and prevent the screw being prised out of engagement with the part-threads. After the band has been tightened the projecting portion of the threaded end 4 may, if desired, be broken off.

The arrangement described provides many advantages and enables an extremely high tensioning force to be applied to the band, whilst the internal surface of the band is substantially smooth and continuous, the gap where the band ends meet being minimised by shaping the ears to complete the circle at this point. Furthermore, with the separate screw unit, when the latter has been detached, the band can be easily removed by simply moving the two ends of the band apart. Moreover, the portion of the threaded end of the band which engages with the worm screw is substantially flat so that the part-threads engage along the whole length of the worm screw.

The construction according to the invention also enables the band to be used to clamp hose pipes of a much smaller diameter than is possible with previous constructions, since the portion of the ear member beneath the plain end of the band, which limited the diameter to which the band could be reduced, is no longer in a position where it interferes with the reduction of the diameter of the band.

Whilst a particular embodiment has been described, it will be understood that various modifications may be made without departing from the scope of this invention. For example the threaded end and the folded-back end of the band may be narrower than the rest of the band and be formed as separate end portions riveted or otherwise secured to the main part of the band. In this way the arrangement according to the invention may be used to secure bands of a greater width than would be practicable if the screw supporting means had to accommodate the total width of the main part of the band.

Furthermore, if desired, for use where the screw supporting means and worm screw carried thereby are formed as a separate unit, the band may be supplied in the form of a metal strip having part-threads formed along a portion at one end of the strip, or at spaced parts along the strip, and the remaining plain part of the band marked in sections corresponding to the lengths of band required for fitting to different hose diameters. The band may be weakened at the markings of the sections, so that the correct length of band may be easily broken off from the strip and the plain end thereof folded back to form the particular size of clip required.

The angle to which the end of the band is folded back is not critical since the forces exerted by tightening the band will cause the folded back portion to flex and assume the angle suitable for the particular diameter at which the clip is being tightened.

I claim:

1. A band or hose clip of the worm gear type, comprising a band, a series of part-threads formed at one end of said band, a support provided at the other end of said band and extending outwardly at an acute angle to the inner surface of said band at said other end, screw supporting means comprising supporting ear members carried from said support, a trunnion member, a pivot carrying said trunnion member between said supporting ear members, and a worm screw carried by the trunnion member and retained against axial movement with respect thereto, whereby the worm screw carried by the trunnion member can be swung into or out of engagement with the threaded end of the band, when said threaded end of the band overlies said support, the forward end of the trunnion member being dimensioned and shaped to bear, when the screw is tightened, against the outer surface of the threaded end at a point forwardly of the pivot, whereby the trunnion member will be urged to turn about the pivot in a direction to force the screw into engagement with the part-threads on the band.

2. A band or hose clip as claimed in claim 1, in which the forward ends of the supporting ear members are shaped so that as the band is tightened, the shaped forward ends tend to complete the circumference of the band circle by bridging the gap where the two ends of the band meet.

3. A band or hose clip of the worm gear type, comprising a band, a series of part-threads formed at one end of said band, a support provided at the other end of said band, said support comprising a short length of said other end of the band which is folded back towards the outer surface of the band so as to form an acute angle to said outer surface of the band at said other end, screw supporting means comprising supporting ear members joined by a transverse portion, a trunnion member, a pivot carrying said trunnion member and mounted between said supporting ear members, a worm screw carried by the trunnion member and retained against axial movement with respect thereto, whereby the screw can be swung into or out of engagement with the threaded end of the band, said threaded end of the band being adapted to overlie said support so as to be engaged by the threads of said worm screw and the transverse portion of said screw-supporting means being adapted to extend across the opposite face of the support to that over which the threaded end of the band is adapted to lie.

4. A band or hose clip as claimed in claim 3 in which the forward ends of the supporting ear members are shaped so that, as the band is tightened, the shaped forward ends tend to complete the circumference of the band circle by bridging the gap where the two ends of the band meet.

5. A band or hose clip as claimed in claim 3, in which the forward end of the trunnion member is shaped to bear against the outer surface of the band, so that when the worm screw is tightened, the trunnion member will be urged in a direction to lock the screw in engagement with the part-threads on the band, and thus prevent the screw from being prised out of engagement with said part-threads.

6. A band or hose clip of the worm gear type, comprising a band, a series of part-threads, formed at one end of said band, a support provided at the other end of said band, said support comprising a short length of the other end of the band which is folded back towards the outer surface of the band so as to form an acute angle to said outer surface of the band at said other end, screw supporting means carried by said support and comprising supporting ear members, a pivot pin carried by said supporting ear members, a trunnion member mounted on said pivot pin between said ear members and a worm screw carried by said trunnion member and retained against axial movement with respect thereto, said worm screw being spaced from said support by a distance sufficient to accommodate the threaded end of the band between said worm screw and said support with the part-threads on said threaded end of the band in engagement with the threads of said worm screw.

7. A band or hose clip of the worm gear type, comprising a band, a series of part-threads formed at one end of said band, a support provided at the other end of said band, said support comprising a short length of said other end of the band which is folded back towards the outer surface of the band so as to form an acute angle to said outer surface of the band at said other end, screw supporting means comprising a channel-shaped member into which said folded back portion is fitted with the base portion of the channel extending across that surface of the folded back portion which faces said outer surface of said other end of the band and with the side walls of the channel extending above and at each side of the folded back portion to form supporting ear members, a trunnion member, pivot means carrying said trunnion member for pivotal movement between said supporting ear members, a worm screw rotatably carried by the trunnion member and retained against axial movement with respect thereto, said worm screw extending rearwardly of the pivot with its axis of rotation nearer to the folded back portion than said pivot, whereby the screw can be swung into or out of engagement with the threaded end of the band when the latter overlies said folded back portion, the forward end of the trunnion member being dimensioned and shaped to bear, when the screw is tightened, against said outer surface at the threaded end of the band at a point forwardly of the pivot whereby the trunnion member will be urged to turn about the pivot in a direction to force the screw into engagement with the part-threads on the band.

8. A band or hose clip of the worm gear type, comprising a band, a series of part-threads formed at one end of said band, a support provided at the other end of said band, said support comprising a short length of the other end of the band which is folded back towards the outer surface of the band so as to form an acute angle to said outer surface of the band at said other end, screw supporting means comprising supporting ear members carried from said support, a trunnion member, a pivot carrying said trunnion member between said supporting ear members and a worm screw carried by said trunnion member and retained against axial movement with respect thereto, said worm screw being spaced from said support by a distance sufficient to accommodate the threaded end of the band between the worm screw and said support with the part-threads on said threaded end of the band in engagement with the threads of said worm screw.

References Cited in the file of this patent

UNITED STATES PATENTS

| Number | Name | Date |
|---|---|---|
| 1,584,935 | Hathorn | May 18, 1926 |
| 2,324,780 | King | July 20, 1943 |
| 2,443,271 | Russell | June 15, 1948 |

FOREIGN PATENTS

| Number | Country | Date |
|---|---|---|
| 336,007 | France | Dec. 28, 1903 |